Patented Oct. 23, 1928.

1,688,857

UNITED STATES PATENT OFFICE.

TAKANOSHIN DOMOTO, OF OSAKA, JAPAN.

LINING COMPOSITION FOR METALLIC CONTAINERS.

No Drawing. Application filed September 5, 1923, Serial No. 661,113, and in Japan December 2, 1922.

This invention relates to a can for preserving soy or "miso", or anything containing it, consisting in a vessel of tin or sheet iron, the inner surface of which is thinly lined with a mixture of a soap insoluble in water, such as aluminum soap, with a solution in a volatile solvent of india-rubber or balata; and the object of my invention is to obtain a vessel very light and of small size, which is not corroded by soy or "miso", and in which the content does not exude like in a cask.

"Miso", as is well known, is a plastic food stuff formed by steaming soya bean, adding thereto rice-koji, that is, steamed rice grown with asperzillus oryzea, and table salt, beaten and kept in a vessel, the starch and proteid being digested by enzyme. It is well known that soy or anything containing it cannot be marketed in metallic vessels because of the corroding effect of the soy on the metal.

Hitherto, soy and "miso" have been exported abroad in bottles and casks. But bottles and casks occupy a large space and their weight, too, is very great, necessitating a high freight. Moreover, bottles and casks are easily damaged, and in the case of casks, the contents exude through the seams, and there is an apprehension of soiling other goods. Thus, there have been many inconveniences in transporting. Now, according to my invention vessels are made of tin or sheet iron, the inner surface of which is lined with a mixture of a solution of india-rubber or balata with an insoluble and acid proof material, forming an anti-corrosive lining; and consequently the above mentioned drawbacks are all effectively removed.

In my invention, the aluminum soap, lime soap or any other soap insoluble in water imparts to the india rubber or balata solution a suitable consistency which results in the formation of a thin water-proof film.

The film being rich in elasticity, there is no fear of its getting cracked owing to sudden expansion or shrinking of the metallic body by sudden changes of climate. Moreover as the lining is made proof against the action of the sodium chloride and organic acids contained in soy or "miso", the metallic surface of the vessel will forever remain uncorroded, and it is a most suitable vessel for exporting such goods.

The following is an example of carrying my invention into effect:—

Take 10 parts of mixed sheet india-rubber and dissolve it in 100 parts of a naphtha or benzol. Mix therewith 5 parts of aluminum soap, and stir well until they evenly mix. Coat the inner surface of a tin vessel of 4 gallon capacity with the mixture thus formed. The solvent will be volatilized and a gummy film will be formed.

In this invention, the mixture may be poured into tin cans, and after causing it to spread all over the inner surface, the excess may be drained off by a centrifugal machine. Or the tin or sheet iron with which to form vessels of my invention, may first be lined with the film by spreading thereon the mixture, and cans may be formed with such tin. In this case, the film being very elastic, will endure without cracking any bending of the sheet metal, and further will serve as a good packing at joint. Thus the lining may be utilized very effectively.

I claim:

A lining composition for metallic vessels, comprising a mixture of rubber, benzol and aluminum soap, in the respective proportions by weight of 10, 100 and 5.

In testimony whereof I have signed my name to this specification.

TAKANOSHIN DOMOTO.